Patented Mar. 27, 1945

2,372,183

UNITED STATES PATENT OFFICE 2,372,183

PURIFICATION OF PYRETHRUM EXTRACT

William F. Barthel, College Park, Md., and Herbert L. J. Haller, Washington, D. C., assignors to the United States of America as represented by Claude R. Wickard, Secretary of Agriculture, and his successors in office No Drawing. Application May 16, 1944,
Serial No. 535,846

6 Claims. (Cl. 260—468)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the purification of relatively impure pyrethrum extracts, containing as active ingredients Pyrethrin I and Pyrethrin II and also variable amounts of extraneous matter, and has among its objects the production of a concentrate having a high percentage of pyrethrins and which is readily soluble in dichlorodifluromethane for purposes as disclosed in United States Patent No. 2,321,023, for example, and which, when dissolved in the dichlorodifluoromethane, may be used in aerosol dispersers without clogging the nozzle due to the crystallization of compounds or precipitation of impurities that are present in the usual pyrethrum extracts; the removal from the impure pyrethrum extract of constituents that cause irritation and staining of fabrics when used as an aerosol; and such other objects as may be apparent from the following description and claims.

In general, according to this invention, the impure pyrethrum extract, which is conventionally obtained as a solution in a hydrocarbon solvent, such as in refined kerosene or petroleum ether, is shaken with an organic solvent, particularly an aliphatic nitro compound having the formula $RNO_2$, where R represents an alkyl group, such as methyl, ethyl, propyl or butyl. The aliphatic nitro compound is a solvent for the pyrethrins but not for some of the impurities, and is immiscible with the hydrocarbon solvent. The aliphatic nitro compound extracts the pyrethrins and may be separated from the hydrocarbon solvent and some of the retained impurities by any conventional means such as a separatory funnel or a centrifugal separator. By repeating the extraction several times with fresh lots of the aliphatic nitro compound, approximately 97 percent of the pyrethrins may be extracted from the starting material.

Certain impurities, however, are also soluble in the aliphatic nitro compound and are separated with the pyrethrins, necessitating additional purification. Therefore, the combined nitro compound solutions are further purified by contacting them with activated carbon, preferably by passing them through a tube containing the carbon. After the carbon treatment, the aliphatic nitro compound is readily removed by evaporation.

The concentrate thus obtained contains 70 to 100 percent pyrethrins, depending on the particular type of starting material used. In case the pyrethrins content in the concentrate is less than 100 percent, a further purification may be effected by mixing the concentrate with a hydrocarbon solvent, preferably one having a low boiling point such as petroleum ether. The hydrocarbon solvent readily dissolves the pyrethrins but does not dissolve the remaining impurities. The hydrocarbon solution of the pyrethrins may be easily separated from the insoluble product containing the remaining impurities by decanting or by a centrifugal separator. In case of a final extraction with hydrocarbons in this manner, the concentrate that remains when the hydrocarbon solvent is removed, as by evaporation, for example, is substantially pure pyrethrins.

Specific examples exhibiting the invention are given below:

Example I

A sample of 500 g. of pyrethrum extract in deodorized kerosene, containing 20 percent pyrethrins, was agitated with three successive 250 ml. portions of nitromethane, the nitromethane solutions being separated from the kerosene solutions with a separatory funnel in each instance. The separated nitromethane solutions were combined and passed through an 8 inch column of activated carbon 1½ inches in diameter. The column of carbon was then washed twice with 100 ml. portions of nitromethane. The combined activated carbon-treated nitromethane solution was combined with the washings and the nitromethane was removed from the combined solutions by distillation under reduced pressure.

The resulting concentrate contained 98 percent pyrethrins as determined by the A. O. A. C. method and weighed 90 g., representing 90 percent of the pyrethrins content of the starting material.

Example II

A second sample of 650 g. of pyrethrum extract in deodorized kerosene, containing 30 percent pyrethrins, was treated as in Example I, except using a 10 inch column of activated carbon.

The resulting residue contained approximately 80 per cent pyrethrins.

This residue was then dissolved in 1 liter of petroleum ether (boiling point 30°–60° C.). The petroleum ether became turbid and an oil separated. After all the oil had separated, the petroleum ether solution became clear. It was separated from the oil, and the petroleum ether was removed from it by distillation on a steam bath.

The concentrate thus obtained weighed 170 g., and the analysis showed a 90 per cent pyrethrins content.

Example III

A sample of 50 g. of pyrethrum extract and oleoresin, containing 27 per cent pyrethrins, was dissolved in 200 ml. of petroleum ether (boiling point 30°–60° C.). The solution was extracted with three successive 200 ml. portions of nitromethane. The nitromethane solutions which were separated from the petroleum ether and retained impurities were combined and passed through a column of activated carbon and the activated carbon-treated nitromethane solution was then concentrated in a manner similar to that of Example I.

Analysis of the concentrate thus obtained showed a 98 per cent pyrethrins content.

Example IV

A sample of 950 ml. of pyrethrum extract in petroleum ether (boiling point 30°–60° C.), containing 8.7 percent pyrethrins, was successively extracted with 200 ml., 100 ml., and 100 ml. portions of nitromethane. The nitromethane solutions which separated from the petroleum ether and retained impurities were combined and passed through activated carbon and concentrated as in Example I.

The concentrate thus obtained contained 68 g. of 99 percent pyrethrins representing an overall recovery of 82.4 per cent.

The foregoing examples are illustrative of the invention but not limiting. Hydrocarbon solvents used with the initial material may vary over a wide boiling range and the nitromethane may be replaced by other alkyl nitro solvents. The proportion of hydrocarbon solvent and alkyl nitro solvent also may be varied over a wide range, as may be the amount and kind of carbon, which may be either of animal or vegetable origin.

That this invention rests upon the combination of at least the alkyl nitro and the activated carbon treatments is shown as follows: If the nitromethane solution, after extracting the pyrethrins but before the treatment with carbon, is evaporated, a concentrate is obtained which normally contains only about 60 per cent pyrethrins and many impurities which are insoluble in dichlorodifluromethane. Also, if the pyrethrum extract in a hydrocarbon solution is treated with activated carbon without the nitromethane treatment, much of the pyrethrins is lost, and certain harmful impurities remain in solution. Consequently, neither procedure produces by itself the desired high concentration of pure pyrethrins. On the other hand, as shown in the examples above, the combined treatment of this invention has been applied to samples containing 20 percent of pyrethrins in refined kerosene, 30 percent of pyrethrins in refined kerosene, 27 percent of pyrethrins and oleoresin, and 7.5 per cent of pyrethrins in petroleum ether, yielding in each case a pyrethrins concentrate of a high degree of purity.

Having thus described the invention, what is claimed is:

1. A process of separating pyrethrins from a solution of relatively impure pryethrum extract in a petroleum hydrocarbon solvent, comprising mixing the solution with an aliphatic nitro compound having the formula $RNO_2$, where R represents an alkyl group, separating the aliphatic nitro compound solution from the petroleum hydrocarbon solution, and contacting the aliphatic nitro compound solution with activated carbon.

2. A process of separating pyrethrins from a solution of relatively impure pyrethrum extract in a petroleum hydrocarbon solvent, comprising mixing the solution with an aliphatic nitro compound having the formula $RNO_2$, where R represents an alkyl group, separating the aliphatic nitro compound solution from the petroleum hydrocarbon solution, contacting the aliphatic nitro compound solution with an activated carbon, and removing the aliphatic nitro compound from the activated carbon-treated solution to obtain a concentrate of purified pryethrins.

3. A process of separating pyrethrins from a solution of relatively impure pyrethrum extract in a petroleum hydrocarbon solvent, comprising mixing the solution with an aliphatic nitro compound having the formula $RNO_2$, where R represents an alkyl group, separating the aliphatic nitro compound solution from the petroleum hydrocarbon solution, contacting the aliphatic nitro compound solution with activated carbon, removing the aliphatic nitro compound from the activated carbon-treated solution to obtain a concentrate, mixing the concentrate with a low boiling point hydrocarbon solvent for the pyrethrins, separating the low boiling point hydrocarbon solution from the undissolved impurities, and evaporating the solvent to obtain a concentrate of purified pyrethrins.

4. The process of claim 1, wherein the aliphatic nitro compound is nitromethane.

5. The process of claim 1, wherein the aliphatic nitro compound is nitroethane.

6. The process of claim 1, wherein the aliphatic nitro compound is nitropropane.

WILLIAM F. BARTHEL.
HERBERT L. J. HALLER.